US007522046B2

(12) United States Patent
Decker et al.

(10) Patent No.: US 7,522,046 B2
(45) Date of Patent: Apr. 21, 2009

(54) DOCUMENT MANAGEMENT

(75) Inventors: Christian Decker, Karlsruhe (DE); Adam M. Eames, Fairfax Station, VA (US); Uwe Kubach, Waldbronn (DE)

(73) Assignee: SAP Aktiengesellschaft, Walldorf (DE)

( * ) Notice: Subject to any disclaimer, the term of this patent is extended or adjusted under 35 U.S.C. 154(b) by 490 days.

(21) Appl. No.: 10/802,038

(22) Filed: Mar. 17, 2004

(65) Prior Publication Data

US 2005/0209812 A1   Sep. 22, 2005

(51) Int. Cl.
    *G08B 13/14* (2006.01)
(52) U.S. Cl. .............................. 340/568.1; 340/539.22; 340/539.26
(58) Field of Classification Search ............ 340/539.22, 340/539.26, 539.6, 539.1, 585, 572.1, 545.6, 340/568.7, 568.1, 10.42, 572.2–572.8, 545.4; 702/128; 235/385
    See application file for complete search history.

(56) References Cited

U.S. PATENT DOCUMENTS

| | | | |
|---|---|---|---|
| 3,609,735 A | | 9/1971 | Dauterman et al. |
| 4,170,346 A | * | 10/1979 | Murray et al. ........... 270/52.04 |
| 5,892,444 A | * | 4/1999 | Wittmer et al. ............ 340/571 |
| 6,008,727 A | | 12/1999 | Want et al. |
| 6,262,662 B1 | * | 7/2001 | Back et al. ............... 340/572.1 |
| 6,373,389 B1 | * | 4/2002 | Przygoda et al. ......... 340/572.4 |
| 6,661,340 B1 | * | 12/2003 | Saylor et al. ............... 340/517 |
| 6,753,775 B2 | | 6/2004 | Auerbach et al. |
| 6,927,687 B2 | | 8/2005 | Carrender |
| 6,927,688 B2 | | 8/2005 | Tice |
| 6,940,092 B2 | * | 9/2005 | Yoshida et al. ............... 257/40 |
| 7,129,840 B2 | * | 10/2006 | Hull et al. ................. 340/568.1 |
| 7,170,409 B2 | * | 1/2007 | Ehrensvare et al. .... 340/539.26 |
| 2002/0126057 A1 | | 9/2002 | King et al. |
| 2002/0147649 A1 | | 10/2002 | White |
| 2004/0046643 A1 | | 3/2004 | Becker et al. |

FOREIGN PATENT DOCUMENTS

| | | |
|---|---|---|
| FR | 2 782 703 | 3/2000 |
| WO | WO02/073523 | 9/2002 |
| WO | WO03/023690 | 3/2003 |
| WO | WO03/044521 | 5/2003 |

OTHER PUBLICATIONS

Decker, Christian, et al., "DigiClip: Activating Physical Documents," *Proceedings of the 24th IEEE International Conference on Distributed Computing Systems Workshops*, Tokyo, Japan, Mar. 23, 2004, pp. 388-393, XP010695633.
Holmquist, L.E., et al., "Building Intelligent Environment with Smart-Its," *IEEE Computer Graphics and Applications*, vol. 24, No. 1, Feb. 24, 2004.
J. Rekimoto et al., "Cybercode: Designing Augmented Reality Environments with Visual Tags" 2000, (10 pages).

* cited by examiner

*Primary Examiner*—Anh V La
(74) *Attorney, Agent, or Firm*—Fish & Richardson P.C.

(57) ABSTRACT

Techniques are provided for document management, which may occur at a physical document, at a remote location, or at a combination thereof. Document management at a physical document may include sensing a state of a document, generating a signal representing the document state, determining the document state based on the signal, and generating a wireless message representing the document state. Document management at a remote location may include storing non-physical versions of documents, receiving state data for physical versions of the documents, associating the state data with the appropriate non-physical versions, and managing access to the non-physical versions and the state data.

48 Claims, 8 Drawing Sheets

DOCUMENT MANAGEMENT

TECHNICAL FIELD

This description relates to documents, and, more particularly, to document management.

BACKGROUND

As computer memory has continued to expand, more and more documents are being stored electronically (e.g., on computers), typically in file management systems. Electronically stored versions of documents offer the benefits of remote access, easy editing, and status monitoring.

Despite the increased use of electronically stored versions of documents, however, hard copy versions (e.g., paper) also continue to be used extensively. Paper versions offer the benefits of reduced eye strain while reading, easier verifiability, satisfying legal requirements, and user access even in non-computer friendly environments.

Because documents may exist in non-physical versions and hard-copy versions, it is often difficult to know which version of a document is the most current. Also, it is difficult to know which version is valid.

SUMMARY

Techniques are provided for document management. In one general aspect, document management is performed, at least in part, at a physical document and includes sensing a state of a document, generating a signal representing the document state, determining the document state based on the signal, and generating a wireless message representing the document state.

The document management may be facilitated by a device physically coupled to the document, an article including a machine-readable medium storing instructions operable to cause one or more machines to perform operations, or other appropriate apparatus. A device physically coupled to the document may include a document coupling device, a sensor coupled to the document coupling device, and a computer coupled to sensor. The sensor may be operable to sense a state of a document and to generate a signal representative thereof, and the computer may be operable to determine the document state based on the signal. In some implementations, the document coupling device may bind the document and/or act as a sensor. The device may also include a wireless communication device operable to send data from and receive data for the computer.

The document state may include the number of document pages, the location of the document, and/or an environmental condition of the document. The number of document pages may be determined by sensing an electrical value affected by a dielectric.

Particular implementations may include receiving document meta-data and/or receiving state data for a non-physical version of a document. Certain implementations may include receiving an allowable document state, which may be expressed as a rule, storing an allowable document state, and/or determining whether an allowable document state has been violated. A visual indication of physical document status may be provided. Some implementations may include detecting activation of a user input device and generating a wireless message to report the activation.

In another general aspect, document management is performed, at least in part, at a location remote from the document and includes storing non-physical versions of documents, receiving state data for physical versions of the documents, associating the state data with the appropriate non-physical versions, and managing access to the non-physical versions and the state data.

The document management may be facilitated by a physical device, an article including a machine-readable medium storing instructions operable to cause one or more machines to perform operations, or other appropriate apparatus. A physical device may include one or more memory locations operable to store non-physical versions of documents and state data for physical document versions, a document management engine operable to manage access to the non-physical document versions, and mediators to manage access to the state data.

The state data may include the number of pages of a physical version, the location of a physical version, and/or an environmental condition of a physical version. State data may also be stored for non-physical versions of documents. Particular implementations may include determining whether a state change has occurred to a non-physical version of a document, determining whether the non-physical version has an associated physical-document monitoring device, and, if the non-physical version has an associated physical-document monitoring device, initiating a message representing the state change.

Certain implementations may include receiving a physical document registration request, determining if an associated non-physical document exists, and associating the non-physical version with a physical-document monitoring device.

Some implementations may include storing allowable states for physical versions of documents, which may be expressed in rules. A message may be generated for a physical-document monitoring device regarding an allowable state for a physical version of a document. Also, a message indicating that an allowable state has been violated may be received; if such a message has been received, the message may be associated with a non-physical version, and the notification of the violation stored. Whether an allowable state has been violated based on a received state may also be determined.

Particular implementations may include receiving a signal indicating that an input device of a physical-document monitoring device has been activated and altering the editing rights of an electronic version of the associated document.

The details of one or more implementations are set forth in the accompanying drawings and the description below. Other features will be apparent from the description and drawings, and from the claims.

BRIEF DESCRIPTION OF DRAWINGS

Like reference symbols in the various drawings indicate like elements.

DETAILED DESCRIPTION

Document management includes monitoring a physical version of a document. The monitoring may include determining a state of the physical version, such as, for example, number of pages, location, and/or environmental condition. The state may be stored and/or analyzed to ensure that the physical version of the document is valid. Document management, however, may also include a variety of other features.

Figure 1:
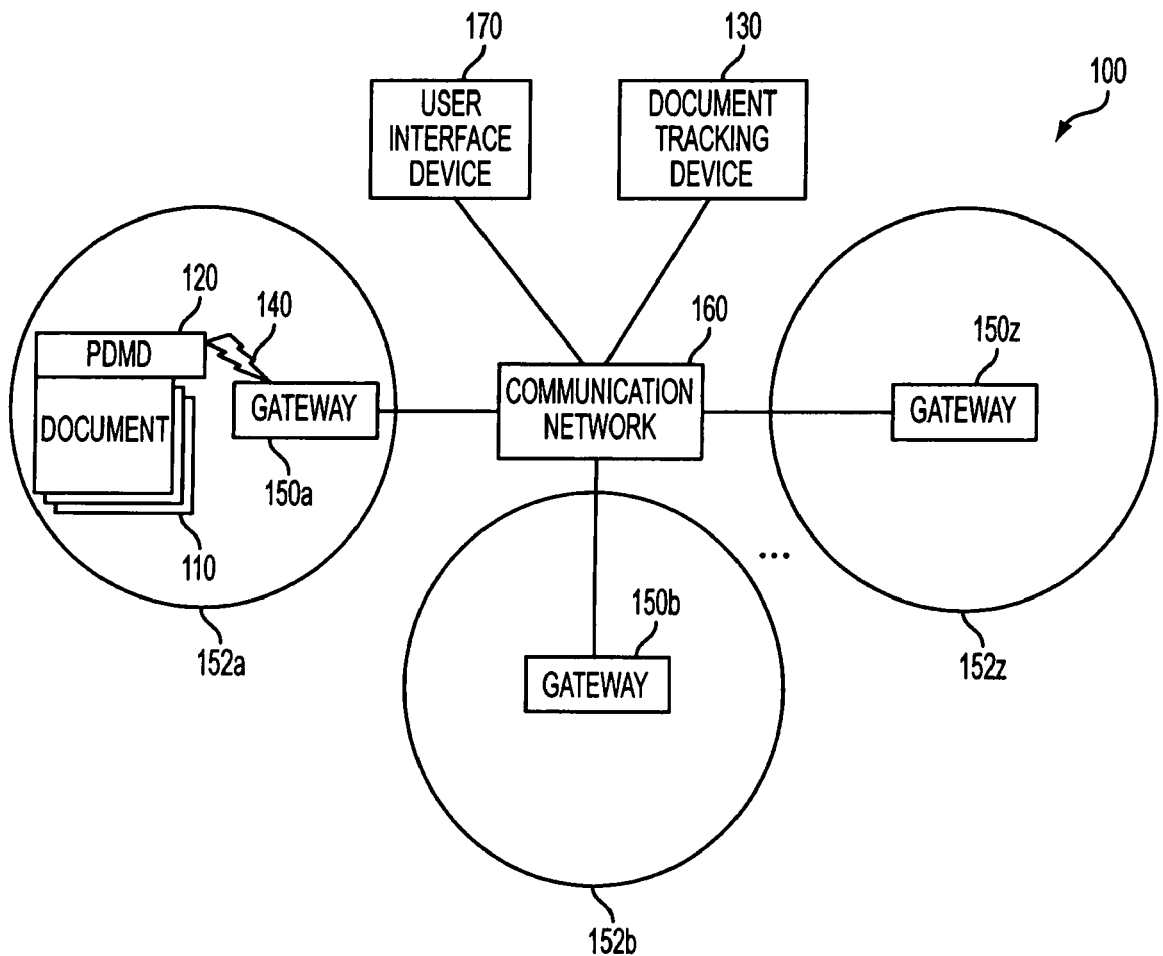
FIG. 1 is a block diagram illustrating a system for document management.

FIG. 1 illustrates a system 100 for document management. System 100 includes a document 110 that is to be managed. Coupled to document 110 is a physical-document monitoring device 120. Physical-document monitoring device 120 is operable to monitor at least one state of document 110 and to communicate the state to a document tracking device 130. Document tracking device 130 stores the state of the document. Physical-document monitoring device 120 and/or document tracking device 130 may also analyze the document state, for example, to determine whether the document state is allowable.

In more detail, document 110 may be any tangible composition, collection, and/or arrangement of information. For example, document 110 may be a contract, a report, a manuscript, or any other composition of words and/or information on paper. Document 110 may, of course, also contain charts, pictures, graphs, tables, and/or other appropriate objects. Document 110 may be bound by a staple, a paper clip, a binder clip, or any other appropriate binding. In particular implementations, document 110 is bound by physical-document monitoring device 120. In other implementations, however, document 110 need not be bound.

Physical-document monitoring device 120 is coupled to document 110 and monitors the document. In general, physical-document monitoring device 120 may monitor any of a variety of state information regarding document 110. For example, physical-document monitoring device 120 may monitor the number of pages of document 110, the location of document 110, and/or an environmental condition of document 110. Physical-document monitoring device 120 wirelessly communicates monitored states of document 110 to document tracking device 130.

In particular implementations, physical-document monitoring device 120 also determines whether a monitored state is allowable. The allowable states may be programmed locally at the physical-document monitoring device or remotely. If a monitored state is not allowable, an appropriate indication may be displayed at the physical-document monitoring device and/or communicated to document tracking device 130. The allowable states may be expressed as rules (e.g., 10° C.$\leq$T$\leq$40° C.).

To allow physical-document monitoring device 120 to communicate with document tracking device 130, system 100 includes a wireless link 140, gateways 150, and a communication network 160. Wireless link 140 may use any appropriate portion of the electromagnetic regime. For example, wireless link 140 may be a radio frequency (RF) link or an infrared (IR) link. If wireless link 140 is an RF link, it may be for a local area network (e.g., IEEE 802.11 or Bluetooth™) or for a wide area network (e.g., a cellular network using IS-95 or IS-136). If wireless link 140 is an IR link, it may operate according to the Infrared Data Association (IrDA) protocol. Physical-document monitoring device 120 may send and/or receive data through wireless link 140.

System 100 uses gateways 150 to wirelessly receive data from and/or to wirelessly send data to physical-document monitoring device 120. In general, gateways 150 may be any appropriate devices for wirelessly receiving and sending data. Gateways 150 may, for example, be wireless access points, base stations, or transceivers. In particular implementations, the gateways may be based on the Smart-Its Particle System from the Telecooperation Office (TecO) at the University of Karlsruhe, Germany.

As illustrated, system 100 includes a number of gateways 150, each gateway having a service area 152. Thus, when document 100 is within one of service areas 152, which may be adjustable for each gateway 150, physical-document monitoring device 120 may communicate with document tracking device 130. Depending on the network configuration, physical-document monitoring device 120 may communicate with document tracking device 130 as document 110 moves between service areas 152. In general, system 100 may have any number of gateways 150. In particular implementations, service areas 152 may be on a per room basis, and the physical document location may be included in communications between the physical-document monitoring device and the document tracking device. To assist in fine grain location tracking, a Receiver Signal Strength Indication (RSSI) may be used in certain implementations.

Communication network 160 also assists in sending data between physical-document monitoring device 120 and document tracking device 130. In general, communication network 160 may be any combination of switches, routers, repeaters, transponders, hubs, and/or other appropriate devices interconnected via communication channels for sending data from one device to another. The communication network may, for example, be a local area network (LAN), a wide area network (WAN), a Public Switched Telephone Network (PSTN), or the Internet. Furthermore, communication network 160 may use any appropriate protocol, such as, for example, X.25, frame relay, Ethernet, or TCP/IP.

As mentioned previously, document tracking device 130 receives and stores the state data regarding document 110. In general, document tracking device 130 may be any appropriate device for receiving and storing data. Document tracking device 130 may also determine whether the document states are allowable.

In particular implementations, document tracking device 130 is a server that also stores a non-physical version of document 110. Thus, document tracking device 130 and physical-document monitoring device 120 may share state information of the physical version (i.e., document 110) and the non-physical version of a document. This information may be used to validate the physical version of the document.

System 100 also includes a user interface device 170. User interface device 170 may be any appropriate device for allowing a user to interact with data in system 100. In particular implementations, user interface device 170 may be a personal computer (PC), a workstation (WS), or a personal digital assistant (PDA). To allow a user to interact with system data, the user interface device may enter into a client-server relationship with document tracking device 130 and visually present a user interface, such as, for example, a graphical user interface (GUI), to the user. As one example of a user interfaces function, a user interface may allow a user to graphically view the location of monitored documents. In particular implementations, user interface device may implement a web interface.

In one mode of operation, physical-document monitoring device 120 is associated with a document 110 through user interface device 170. The association may include informing document tracking device 130 of the association so that it can prepare to track the document. The association may, for example, be made at a printer that printed the document.

Additionally, the allowable states of document 110 are received by physical-document monitoring device 120 through user interface device 170. In certain implementations, the allowable states may be received by document tracking device 130, to the exclusion of physical-document monitoring device 120 or in conjunction with physical-document monitoring device 120.

After initial set up, physical-document monitoring device 120 begins monitoring the appropriate states of document 110. If a monitored state is sensed, physical-document monitoring device 120 communicates the state to document tracking device 130 through wireless link 140, gateway 150, and communication network 160. Document tracking device 130 associates the state with document 110 and stores the state, for later retrieval and analysis. Physical-document monitoring device 120 and/or document tracking device 130 may time stamp the sensed state to assist in analysis.

Physical-document monitoring device 120 also determines whether a sensed state is allowable. If a sensed state is allowable, physical-document monitoring device 120 may resume sensing states. If a sensed state is not allowable, physical-document monitoring device 120 sends an indication of the violated state to document tracking device 130, which stores the indication.

Physical-document monitoring device 120 may continue to monitor document 110 for any appropriate period of time. For example, physical-document monitoring device 110 may monitor the document until an unallowable state is encountered or until a designated period of time has expired.

User interface device 170 may also be used to determine the current and past states of the physical version. The user interface may also be used for configuring system 100.

System 100 has a variety of features. For example, the state of a physical document may be monitored and recorded. This may assist in determining the state of the document (e.g., location) or the validity of the document at a later time. For instance, knowing the location history of a physical version may allow for determining whether access was improperly allowed. Monitoring and recording the physical document state may also assist in determining the validity of a non-physical version of the document. Thus, consistency between a physical version of a document and a non-physical version of a document may be enhanced. Furthermore, validity issues may be identified quickly. As another example, the state of a non-physical version of a document may be available at the physical document. Thus, a physical document custodian may be able to determine whether validity issues exist with the physical document. As an additional example, properties, like integrity and access restrictions, as well as the tracking of changes, may be synchronized between physical versions and non-physical versions of a document. This may allow physical versions and non-physical versions to be aware of and reactive to changes at each other. For instance, a change in a non-physical version (e.g., a change in information) may lead to a reaction at the physical version (e.g., a change in status display). In the reverse, a change of the physical version's state (e.g., a change in location) may be reflected by a change of the information associated with the non-physical version. As another example, the implementation of the document management may occur in such a way that the reasons for physical documents are not diminished. Also, because various implementations are available with standard paper, document management may be achieved without requiring special paper.

Although FIG. 1 illustrates a system for document management, other implementations may include fewer, additional, and/or a different arrangement of components. For example, a document management system may have a number of documents that are being monitored, and each document may have its own physical-document monitoring device. As another example, the service areas of the gateways may be contiguous or overlap. Thus, a document may move within a document management system with a physical-document monitoring device rarely, if ever, being out of communication with a document tracking device. As a further example, the communication network may be part of a larger communication network (e.g., the Internet).

Figure 2:
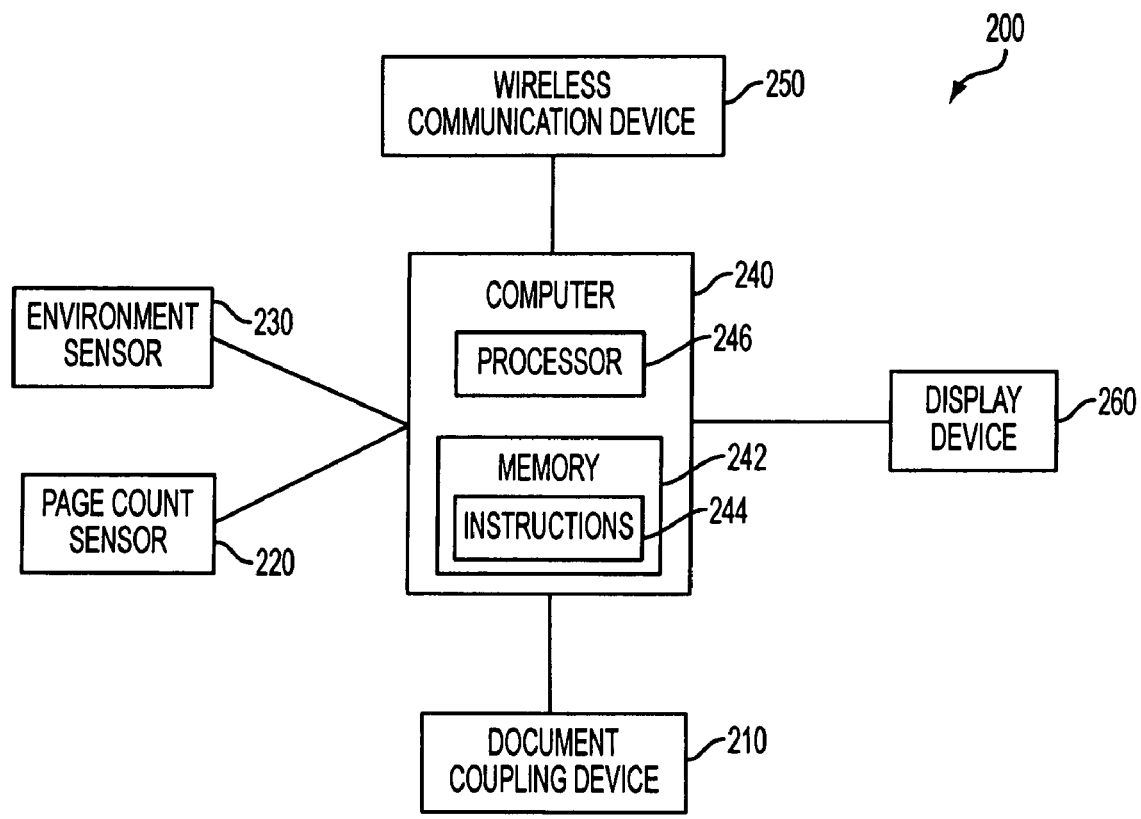
FIG. 2 is a block diagram illustrating a physical-document monitoring device for the system in FIG. 1.

FIG. 2 illustrates a physical-document monitoring device 200. Physical-document monitoring device 200 is one example of physical-document monitoring device 120 in FIG. 1. As illustrated, physical-document monitoring device 200 includes a document coupling device 210, a page count sensor 220, an environment sensor 230, a computer 240, a wireless communication device 250, and a display 260.

Document coupling device 210 is operable to physically couple physical-document monitoring device 200 to a physical version of a document. Document coupling device 210 may, for example, be a staple, a paper clip, or a binder clip. Implementing the document coupling device as a document binding apparatus has the advantage of incorporating document management functionality into an apparatus that is already in common use with documents. Thus, users are not burdened with additional interactions with the document.

Page count sensor 220 is operable to sense the number of pages in a document. One example of page count sensor 220 is a capacitive device that uses the pages of the document as the dielectric. Thus, the more pages a document contains the lower the capacitance will be and the higher the voltage across the capacitor will be. Various electrical properties, such as, for example, voltage, charge, or current, may be measured to determine the capacitance and, hence, number of pages. An implementation of a capacitive device will be discussed in more detail below. Another example of page count sensor 220 is a light transmission/reception system. In such a system, a light (e.g., from an LED) is transmitted through the pages of a document. Based on the strength of the light after it has traversed the document, a determination may be made of the number of pages of the document. Page count sensor 220 generates a signal representative of the number of pages sensed.

Environment sensor 230 may be any appropriate sensor for sensing a condition in, on, or in the vicinity of a document, conditions in the vicinity of the document being part of the document's environmental state. Examples of an environment sensor include a temperature sensor (e.g., resistive temperature device or thermocouple), an illumination sensor, (e.g., bolometer or charge-coupled device), a noise sensor (e.g., a microphone), and a movement sensor (e.g., accelerometer). Environment sensor 230 generates a signal representative of the environment condition sensed.

Computer 240 is coupled to page count sensor 220 and environment sensor 230, and includes memory 242 and a processor 246. Memory 242 may include random access memory (RAM), read-only memory (ROM), compact-disk read-only memory (CD-ROM), and/or any other appropriate device for storing information. Memory 242 includes instructions 244, according to which processor 246 operates. Processor 246 may be a complex instruction set computer (CISC), a reduced instruction set computer (RISC), a field programmable gate array (FPGA), or any other appropriate device for manipulating information in a logical manner. In particular implementations, computer 240 may be based on the Smart-Its Particles from TecO at the University of Karlsruhe, Germany.

Wireless communication device 250 is coupled to computer 240 to wirelessly send data from and to wirelessly receive data for computer 240. Wireless communication device 250 may include a wireless transmitter, a wireless receiver, a wireless transceiver, and/or any other appropriate device for wireless sending and/or receiving information. Wireless communication device 250 may operate in any appropriate electromagnetic regime (e.g., RF or IR) and according to any appropriate protocol (e.g., IEEE 802.11, Bluetooth™, cellular, or IrDA). In particular implementations, wireless communication device 250 may sense the location of a document by detecting a wireless communication object (e.g., a gateway). In other implementations, wireless communication device 250 may sense the location of a document by receiving a location signal generated by another system component (e.g., a document tracking device).

Display device 260 is also coupled to computer 240. Display device 260 is operable to provide a visual indication of the status of physical-document monitoring device 200 and/or the monitored document. Display device 260 may include light emitting diodes (LEDs), a liquid crystal display (LCD), a cathode ray tube (CRT) display, and/or any other appropriate device for providing a visual information.

The active components of document tracking device 200 may be powered by any appropriate power source. In certain implementations, a AAA-size battery may be used. Such a power source may provide operability for approximately one year if physicals triggers, such as, for example, document movement, are used for measuring and communicating.

In one mode of operation, the operations of physical-document monitoring device 200 are initiated by instructions received through wireless communication device 240. The instructions may inform the physical-document monitoring device of when to begin and end operations (e.g., a time period), the parameters of the monitored document (e.g., page type), the allowable state(s) of the monitored document, and the state data to be communicated to a document tracking device.

After registering with a document tracking device and being coupled to the document to be monitored (e.g., after a document is printed), physical-document monitoring device 200 begins monitoring the document using page count sensor 220 and environment sensor 230. The sensors may make their measurements on a periodic, aperiodic, event-driven basis, or other appropriate basis.

When sensors 220, 230 measure a state, they generate a signal representative thereof. Computer 240 receives the signals representing the measurements from the sensors and determines the sensed state. Computer 240 sends representations of the determined states to wireless communication device 250, for conveyance to the document tracking device. Computer 240 also determines whether a state is allowable. For example, the computer may determine that the document being monitored does not have the appropriate number of pages or that an environmental condition (e.g., illumination) is out of bounds. Illumination, for example, may be out of bounds if the document is placed in a bag or briefcase.

If a state is not allowable, the computer generates an indication that is presented by display device 260. The indication may be the activation of a light, the display of a text message, the display of a graphic symbol, or other appropriate indicator. Computer 240 also sends a signal indicating that an unallowable state has occurred to wireless communication device 250, for conveyance to the document tracking device.

Physical-document monitoring device 200 may continue to monitor a document for any appropriate period of time. For example, the physical-document monitoring device may monitor the document until an unallowable state is encountered or until a designated period of time has expired. The end of the monitoring may be specified in the instructions received though wireless communication device 250.

In other modes of operation, the physical-document monitoring device 200 may also receive document meta-data (e.g., author, title, creation date, revision history, theme, and/or keywords) from the document tracking device. Computer 240 may store the data in memory 242 and provide the data on display device 250. Additionally, physical-document monitoring device 200 may also receive state data for a non-physical version of the document from the document tracking device. The computer may use the state data of the non-physical version to validate the physical version of the document. For example, if the state data of the non-physical version indicates that it has been edited recently, computer 240 may determine that the physical version is no longer valid.

Although FIG. 2 illustrates one example of a physical-document monitoring device, other implementations may include fewer, additional, and/or a different arrangement of components. For example, some implementations may not include a page count sensor and/or an environmental sensor. As an additional example, some implementations may include a computer for each of the sensors. As a further example, some implementations may not include a display device. As another example, some or all of the instructions may be encoded on the processor.

In particular implementations, the page count sensor may include the document coupling device. For example, if the document coupling device is a binder clip, the page count sensor may use the sides of the bind clip as capacitive plates. The pages of the physical document to be monitored would then act as the dielectric. A voltage on the plate may then be measured to determine the number of pages in the physical document.

In certain implementations, a physical-document monitoring device may include a user input device (e.g., a button, a keypad, or a touchpad). By activating the input device, a user could indicate one or more of a variety of procedures. For example, activation could indicate a request for document data, from the physical-document monitoring device and/or a document tracking device. As another example, activation could indicate that an event has occurred for the physical version of a document. The activation may be correlated with other data regarding the document to complete and/or determine a procedure.

As one example, activating the input device could be used for notification and confirmation in a document signature process. Typically, such processes involve a number of people signing a document. By activating the input device, each signatory may indicate that a particular signature has been performed for the monitored document. Furthermore, by tracking the location of the monitored document, the signatory may be determined and/or confirmed.

As another example, the input device may be useful where rules for a document may be altered in situations that can be better recognized by a user interacting with the physical document. For instance, activating the input device could establish the right to edit an electronic version of a document. This could, for example, be applicable in the situation where a first user is currently editing the electronic version of the document, a second user has the physical document with the physical-document monitoring device attached and wants to edit the document, but the first user has imposed a restriction that locks the electronic version. By activating the input device, the lock of the first user is released by demanding that the first user save and close the document or by a document management engine executing this automatically.

As a further example, activating the input device may establish a lock before the editing process. For instance, if a user has the physical document with the attached physical-document monitoring device and activates the input device, no one can revoke the right to edit the electronic document, because the user has authorized the editing by providing proof of being in possession of the physical version of the document.

Figure 3A:
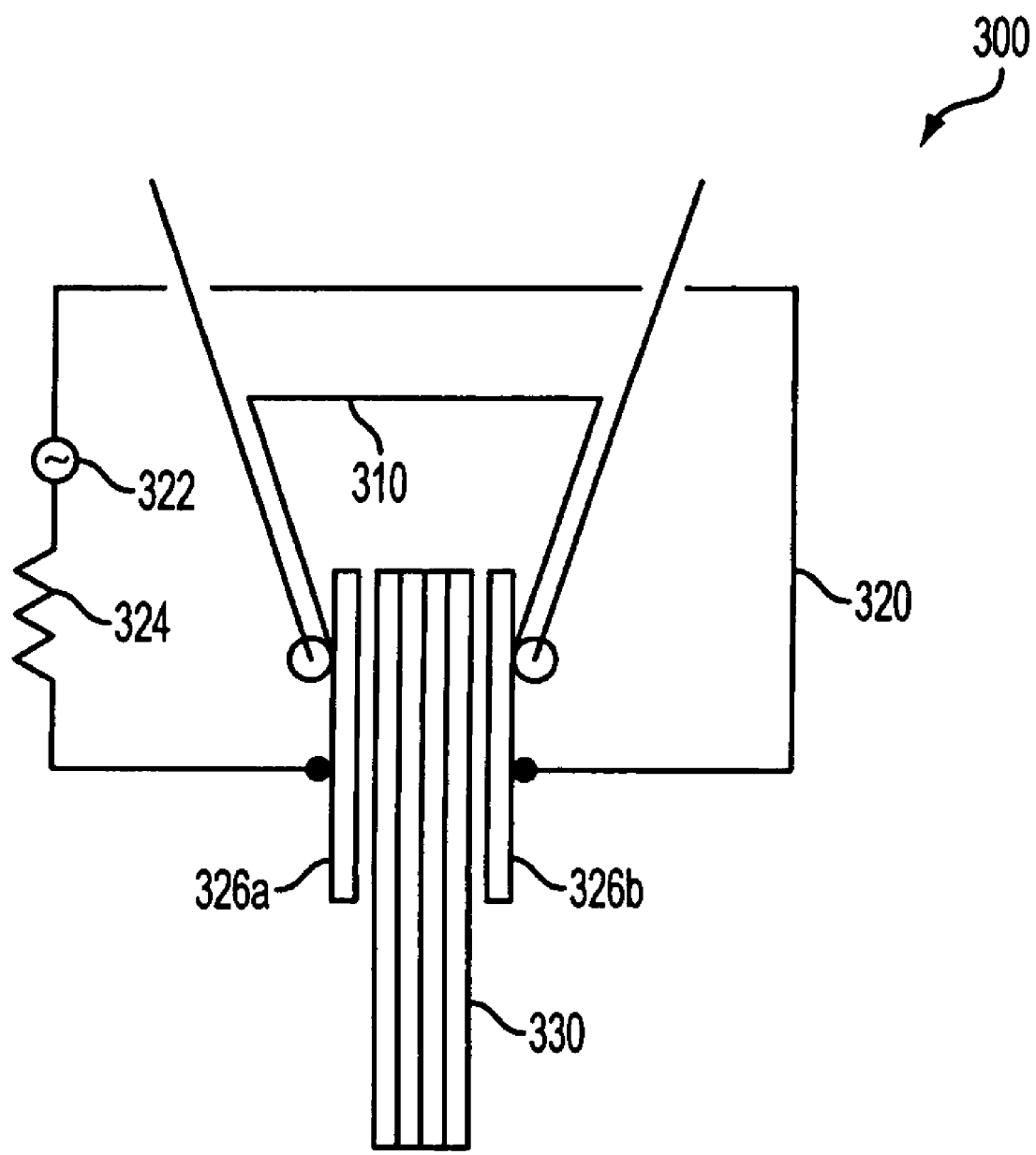
FIGS. 3A-C illustrate an example physical-document monitoring device.
Figure 3B:
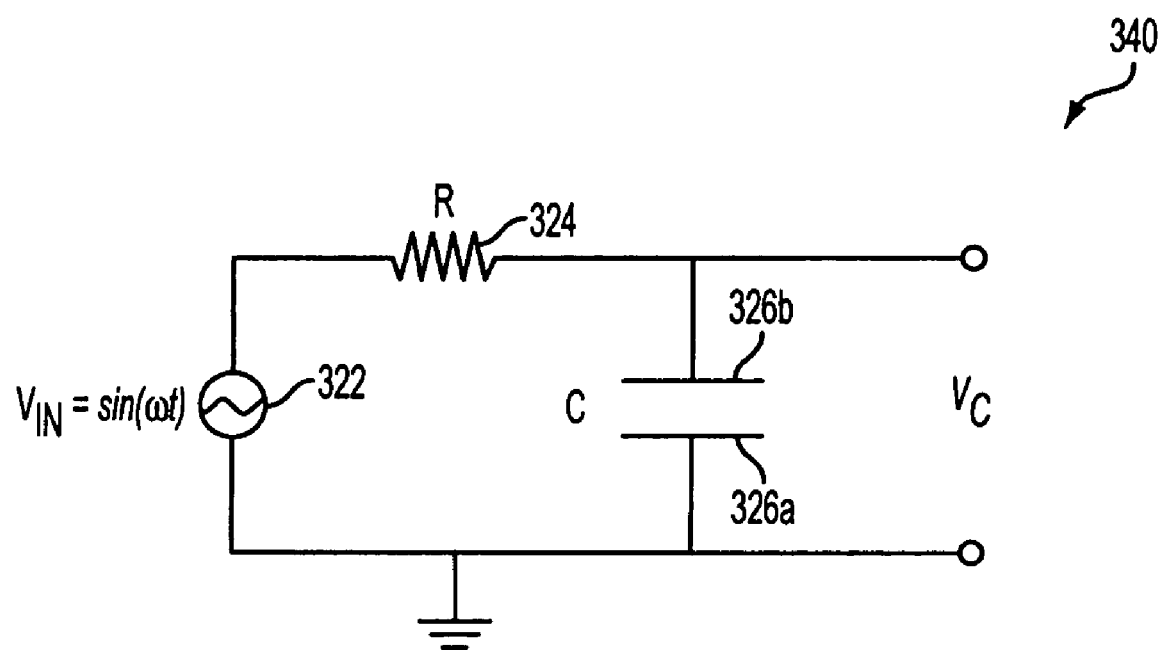
Figure 3C:
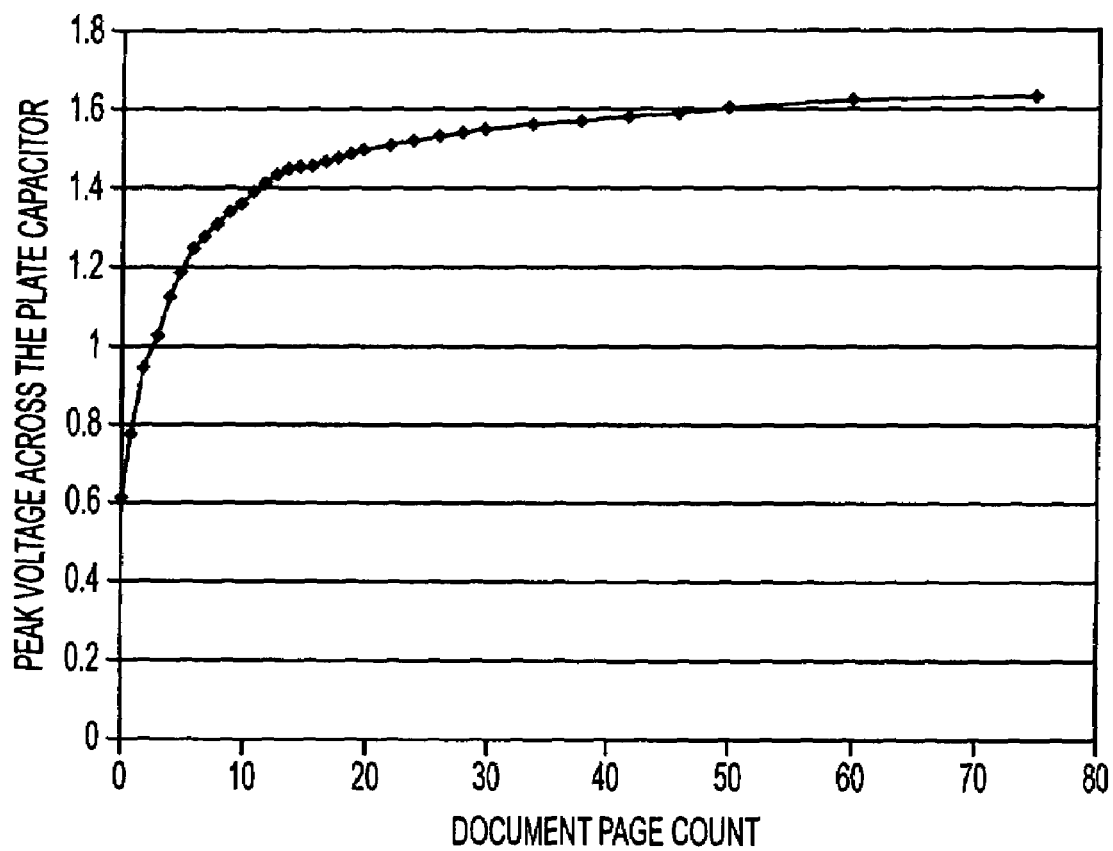

FIGS. 3A-C illustrate a physical-document monitoring device 300. Physical-document monitoring device 300 is operable to sense the page count of a document.

As seen in FIG. 3A, physical-document monitoring device 300 includes a binder clip 310 and an electronic circuit 320. Binder clip 310 facilitates coupling of monitoring device 300 to a document 330. Binder clip 310 may or may not serve as the principle binding for the document. Electronic circuit 320 includes a sinusoidal voltage input 322, a resistor 324, and capacitive plates 326. The capacitive plates are coupled to binder clip 310 and also facilitate coupling of monitoring device 300 to the document. Capacitive plates 326 may act as a capacitor by themselves or when coupled to document 330.

FIG. 3B illustrates a circuit diagram 340 of electronic circuit 320. As can be seen, circuit 320 has sinusoidal voltage input 322, resistor 324, and capacitive plates 326. The capacitance between the plates may be expressed as:

$$C = \varepsilon_0 * \varepsilon_r * \frac{A}{d},$$

where
$\varepsilon_o$=dielectric coefficient,
$\varepsilon_r$=relative dielectric coefficient (~5.6 for paper),
A=the area of the plates, and
d=the distance between the plates.

Because the number of pages in document 330 affects the distance and, hence, the capacitance, measuring the voltage across capacitive plates 326 provides an indication of the number of document pages. The relationship of the voltage across capacitive plates 326 to voltage input 322 may be expressed as:

$$V_C = V_{IN} * \frac{1}{\sqrt{R^2 * \omega^2 * C^2 + 1}}$$

FIG. 3C shows the voltage across capacitive plates for one implementation. In this implementation, the input voltage was 1.65 V, the frequency of the input voltage was 100 kHz, and the resistance of the resistor was 20 kΩ.

As can be seen, the voltage across the capacitive plates due to fewer or additional pages in a document varies the most when a document contains only a few pages. However, the voltage across the capacitive plates due to fewer or additional pages does continue to change even for documents with many tens of pages. Storing a representation of the curve may assist in determining page count and/or in determining changes in page count. Note that the accuracy of the page count measurement may degrade for documents containing pages of varying thickness. Also, the physical-document monitoring device may have to be adjustable, because paper weight may vary from document to document.

A physical-document monitoring device may also recognize other conditions with such a document coupling device. For example, the physical-document monitoring device may recognize that the clip is empty or that the clip is open.

Figure 4:
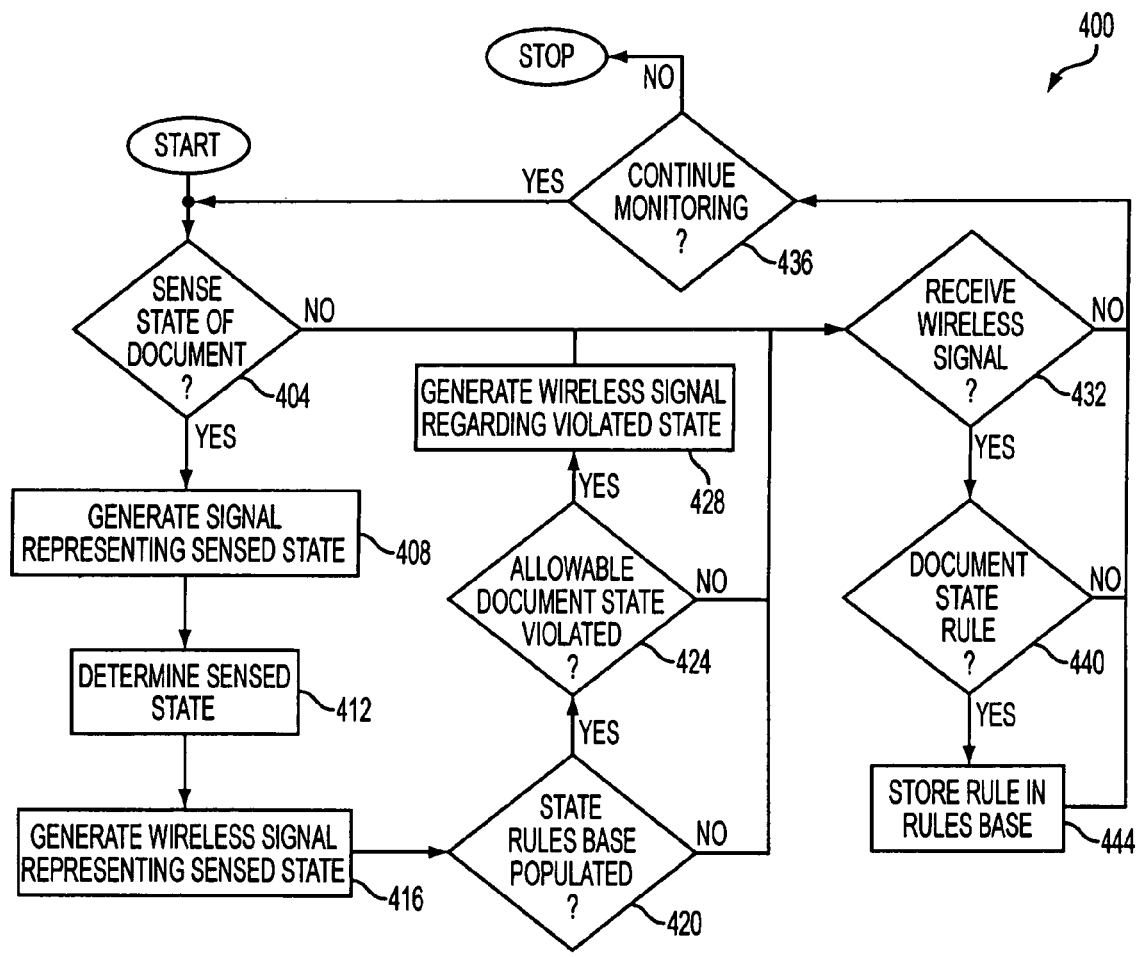
FIG. 4 is a flow chart illustrating a process for document management.

FIG. 4 is a flow chart illustrating a process 400 for document management. Process 400 may, for example, describe the operations of physical-document monitoring device 120 of FIG. 1.

The process begins with determining whether a state of a document has been sensed (decision block 404). The state of a document may be sensed continuously, periodically, aperiodically, on an event-driven basis, or other otherwise. If a state of a document has been sensed, the process calls for generating a signal (e.g., analog, or digital) representing the sensed state (function block 408), and determining the sensed state (function block 412). The sensed state may be determined using a formula, a table look up, or otherwise.

The process also calls for generating a wireless signal, which may be in the form of a wireless message, representing the sensed state (function block 416), and determining whether a state rules base has been populated (decision block 420), the state rules base expressing the allowable states for the monitored document. If the state rules base has been populated, the process calls for determining whether an allowable document state has been violated (decision block 424). An allowable document state may be violated, for example, if the sensed state is outside allowable bounds. If an allowable document state has been violated, the process calls for generating a wireless signal regarding the violated state (function block 428).

Returning to decision block 404, if a document state has not been sensed, the process calls for determining whether a wireless signal has been received (decision block 432). If a wireless signal has not been received, the process calls for determining whether monitoring should continue (decision block 436). Monitoring may be discontinued, for example, if an allowable state has been violated. If monitoring should not continue, the process is at an end. If, however, monitoring should continue, the process calls for returning to check for a sensed document state (decision block 404). Checking for a sensed document state and a received wireless signal may occur any number or times.

If, however, a wireless signal has been received, the process calls for determining whether the signal represents a document state rule (decision block 440). If a document state rule is represented, the process calls for storing the rule in the document state rules base (function block 444). The rule may be checked against subsequently sensed and determined document states.

Although FIG. 4 illustrates one implementation of a process for document management, other implementations may include fewer, additional, and/or a different arrangement of operations. For example, a process for document management may include an initialization procedure. During an initialization procedure, a physical-document monitoring device may be associated with a document by a document tracking device. Also, the state rule base may be populated. Furthermore, document meta-data may be received. As another example, a process for document management may call for generating a visual display of the monitoring status (e.g., active, allowable state violated, change in non-physical-version state, etc.) and/or the document state (e.g., page count, environmental condition, state violation, etc.). As an additional example, a process for document management may not call for generating a wireless signal representing a sensed state. As a further example, a process for document management may not call for determining whether an allowable state has been violated. Such a determination may, for example, be accomplished by a document tracking device. As another example, information regarding a non-physical version (e.g., document meta-data) may be received and stored. This information may be accessed through the document monitoring device, a properly equipped PDA, or other appropriate device. As an additional example, a process for document management may include determining whether a user input device of a physical-document monitoring device has been activated. If such a user input device has been activated, the activation may be recorded. Also, information may be presented (e.g., visually, audibly, or otherwise) to a user based on the activation. Additionally, the activation may be reported to a document tracking device. The activation may be correlated with other state data about a document being monitored to signify and/or confirm an event regarding the document.

Figure 5:
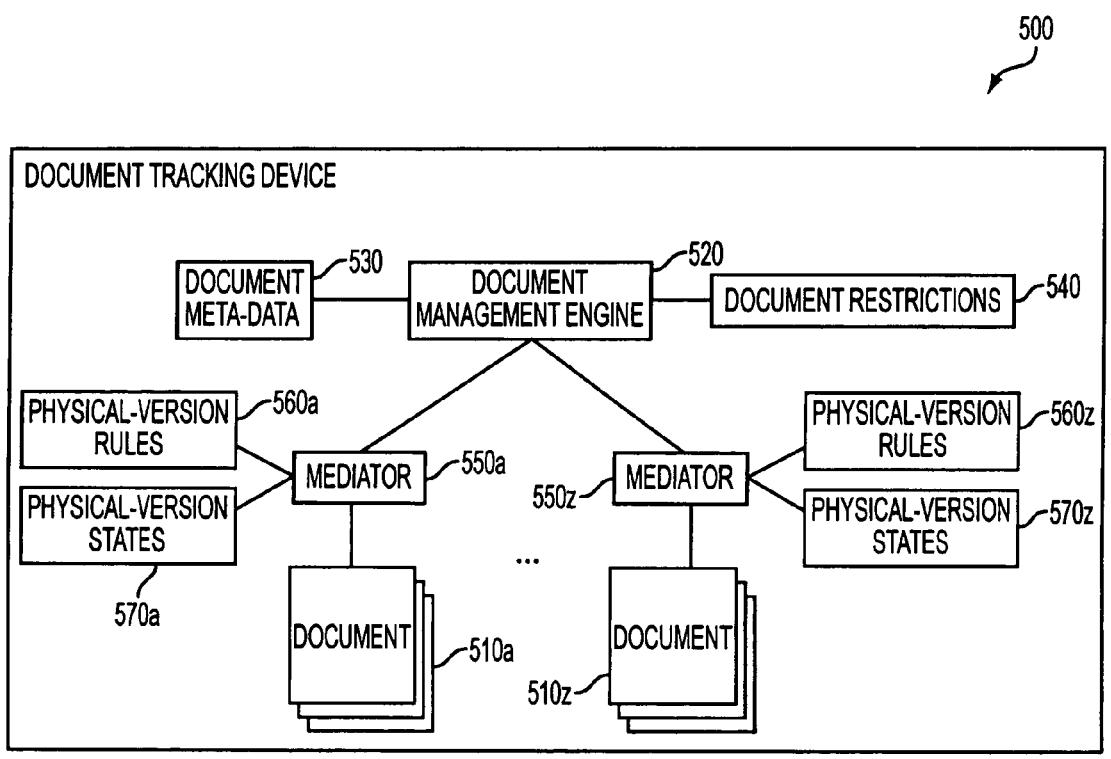
FIG. 5 is a block diagram illustrating a document tracking device for the system in FIG. 1.

FIG. 5 illustrates a document tracking device 500. Document tracking device 500 may be similar to document tracking device 130 in FIG. 1. Document tracking device 500 includes documents 510, which are non-physical versions of documents, a document management engine 520, document meta-data 530, and document restrictions 540. Document tracking device 500 also includes mediators 550, physical-version rules 560, and physical-version states 570.

Documents 510 include any non-hard-copy representation of a document. Documents 510 may be maintained in any appropriate media and in any appropriate format. For example, the documents may be stored in magnetic and/or optical memory. Furthermore, the documents may be word processing documents (e.g., Microsoft® Word, Corel Word-Perfect®, or ASCII documents), spreadsheet documents (e.g., Microsoft® Excel or Lotus®123 documents), presentation documents (e.g., Adobe® PDF, Microsoft® Power-Point, or Tagged Image File Format (TIFF) documents), or other appropriate document format. Typically, each of documents 510 is stored as an individual file, although it need not be.

Document management engine 520 is responsible for managing access to documents 510. To manage access to the documents, document management engine 520 may include a file management system. Using a file management system, document management engine may determine the states of documents 510 (e.g., size, last modification time, etc.), allow access to documents 510, and track the access and states. Document management engine 520 may also include a database to assist with or perform these operations. The document states, along with other information, such as, for example, identification information (e.g., author, title, creation time, etc.), is stored in document meta-data 530. Note that at least some of the document meta-data 530 is typically common to both the physical and non-physical versions of documents. Document restrictions 540 specify the access restrictions to documents 510. Document meta-data 530 and document restrictions 540 may, for example, be stored in one or more databases.

Mediators 550 are responsible for enhancing document management engine 520 in order to manage physical versions of documents 510. To accomplish this, mediators 550 may track the consistency between the physical and non-physical versions of a document. In particular implementations, mediators 550 may be a service running in a document management system to connect the physical versions to the structure of the document management system and vice-versa.

As illustrated, each document 510 has its own mediator 550 that is responsible for physical versions of the document. Mediators 550 manage physical-version rules 560, which may have been received from a user interface device, and physical version states 570, which may have been received from physical-document monitoring devices, for documents 510. In certain implementations, mediators 550 may be able to generate physical-version rules 560 based on document restrictions 540. The physical-version rules may be applicable only for the associated document 510. Physical-version rules 560 and physical-version states 570 may, for example, be stored in one or more databases.

Any of a variety of hardware devices may be used to implement document tracking device 500. For example, the document tracking device may include memory, a processor, and a network interface card (NIC). The memory may include RAM, ROM, CD-ROM, and/or any other appropriate information storage device. The processor may be CISC, a RISC, FPGA, or any other device for manipulating information in a logical manner. The NIC may be an Ethernet card, a modem, an Asynchronous Transfer Mode (ATM) card, a transceiver, or any other appropriate device for sending and receiving information from a communication network.

In one mode of operation, document tracking device 500 begins tracking a physical version of a document upon receiving a physical-document registration request. A physical-document registration request may, for example, include an identification of the document to be tracked and the physical-document monitoring device that is to monitor the document.

Upon receiving a physical-document registration request, the document tracking device may perform initialization operations for the tracking. These operations may include establishing a location (e.g., memory location and/or database record) for storing physical-version states 570 (e.g., tracking information). Also, these operations may include negotiating with the physical-document monitoring device regarding the document states to be monitored. Additionally, these operations may include determining whether any rules for the physical version exist. The rules may be pre-stored by the document tracking device, received during the registration process, and/or generated from access restrictions. If rules are available, the associated mediator 550 establishes procedures to monitor the rules.

Once the registration procedure is complete, the document tracking device waits for a signal representing a state of the physical version. The signal may arrive in the form of one or more messages. When the document tracking device receives such a signal, the associated mediator 550 stores the state in physical-version states 570 and determines whether any physical-version rules 560 exist. If the physical version has rules, the associated mediator determines whether an allowable document state has been violated. If an allowable document state has been violated, the mediator device may record a violation in physical-version states 570.

The document tracking device may also send information regarding the state of the non-physical version to the physical-document monitoring device. Thus, information regarding the non-physical version (e.g., modified, deleted, accessed, etc.) may be available at the physical version.

Although document tracking device 500 illustrates one example of a document tracking device, other implementations may have fewer, additional, and/or a different arrangement of components. For example, a document tracking device may not have mediators for tracking physical versions of documents. The document management engine may, for example, perform the tracking. As another example, a document tracking device may not store non-physical versions of documents. As an additional example, a document tracking device may not store physical-version rules.

Figure 6:
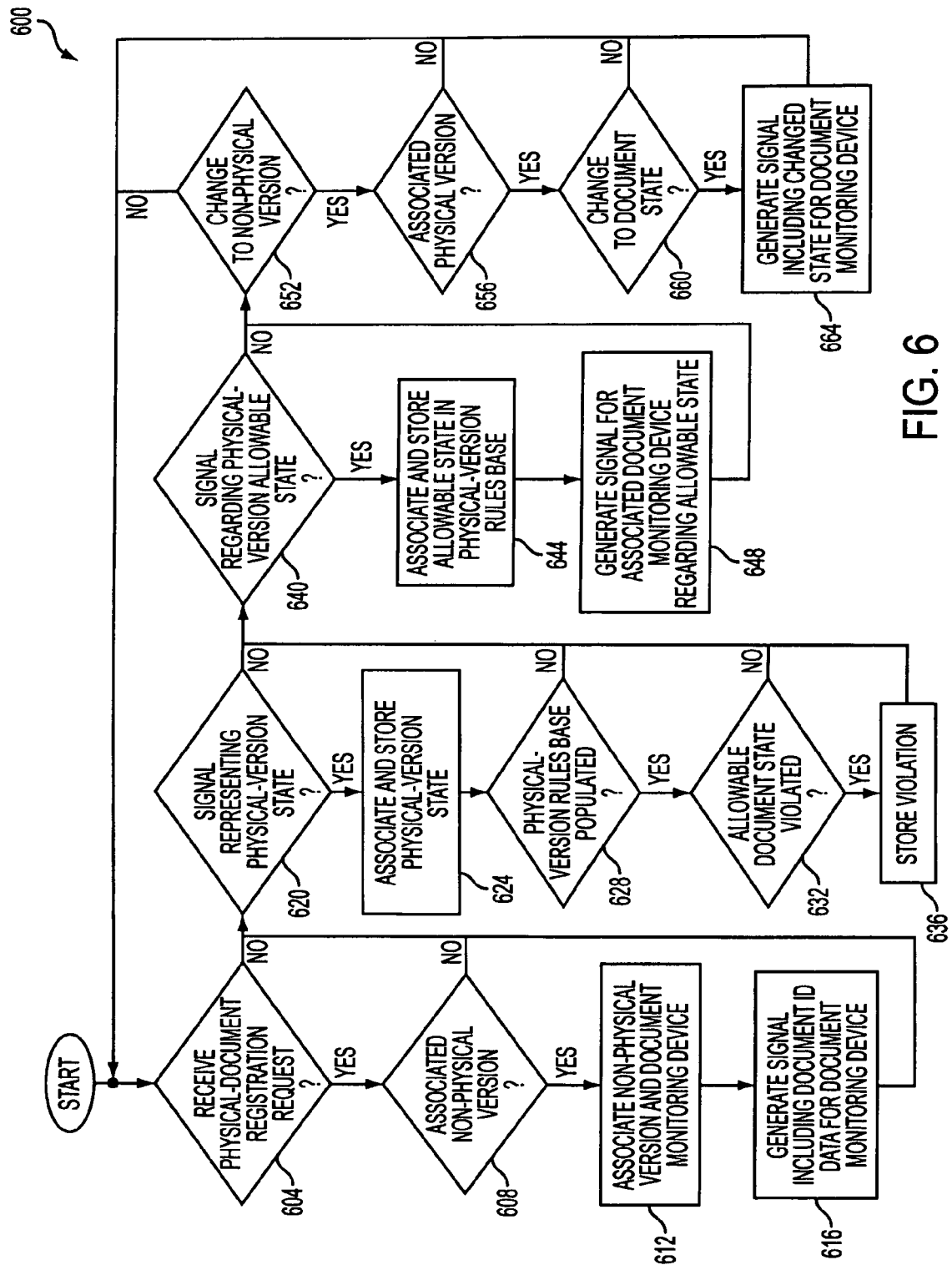
FIG. 6 is a flow chart illustrating a process for document management.

FIG. 6 is a flow chart illustrating a process 600 for document management. Process 600 may, for example, describe the operations of document tracking device 130 in FIG. 1.

The process begins with determining whether a physical-document registration request has been received (decision block 604). A physical-document registration request may, for example, include an identification of the document to be managed and the physical-document monitoring device that is to monitor the document. If a physical-document registration request has been received, the process calls for determining whether a non-physical version of the document exists (decision block 608). If a non-physical version of the document does not exist, the registration procedure is at an end. If, however, there is a non-physical version of the document, the process calls for associating the non-physical version and a physical-document monitoring device that is to perform the monitoring (function block 612). The association may, for example, be accomplished by associating an identifier (e.g., Electronic Serial Number (ESN), network address, etc.) for the physical-document monitoring device that is to monitor the physical version of the document with the non-physical version of the document. The process also calls for generating a signal, which may be in the form of a message, including meta-information for the document to be monitored for the associated physical-document monitoring device (function block 616). The signal may then be sent to the associated physical-document monitoring device.

If the registration procedure is complete, or if the registration procedure is not undertaken, the process calls for determining whether a signal (e.g., a message) representing a state of a physical version of a document has been received (decision block 620). If such a signal has been received, the process calls for associating the physical-version state with a non-physical version of the document and storing the state (function block 624). The process also calls for determining whether a physical-version rules base has been populated (decision block 628). If a physical-version rules base has not been populated, the physical-version state receipt procedure is at an end. If, however, the physical-version rules base has been populated, the process calls for determining whether an allowable document state has been violated (decision block 632). Determining whether an allowable document state has been violated may, for example, be accomplished by comparing the received physical-version state against the rules in the rules base. If an allowable document state has been violated, an indication of the violation is stored (function block 636).

If the physical-version state receipt procedure is complete, or if a physical-version state has not been received, the process calls for determining whether a signal (e.g., a message) regarding a physical-version allowable state has been received (decision block 640). If a signal regarding a physical-version allowable state has been received, the process calls for associating the allowable state with a non-physical version of the document and storing the allowable state in the physical-version rules base (function block 644). The process also calls for generating a signal for the associated physical-document monitoring device regarding the physical-version allowable state (function block 648).

If the physical-version allowable state receipt procedure is complete, of if a physical-version allowable state has not been received, the process calls for determining whether a change to a non-physical version of a document has occurred (decision block 652). This may, for example, be accomplished by determining whether the document has been accessed or edited or if a process has been annulled. If a change to a non-physical version of a document has occurred, the process calls for determining whether an associated physical version of the document exists (decision block 656). If, however, an associated physical version of the document does exist, the process calls for determining whether a change to the non-physical-version state has occurred (decision block 660). A change to the state may include an increase or decrease in the size of the document, a change in the last-modified time, or any other appropriate state change. If a change to the non-physical-version state has occurred, the process calls for generating signal including the changed non-physical-version state for the associated physical-document monitoring device (function block 664).

If the non-physical version state change procedure is complete, or if a change has not occurred to a non-physical version, the process calls for returning to check whether a physical document registration request has been received (decision block 604). Note that more than one physical document may be managed at any one time. Determining whether a physical document registration request has been received (decision block 604), whether a signal representing a state of a physical version of a document (decision block 620), whether a signal regarding an allowable state of a physical version of a document (decision block 640), and whether a change to a non-physical version of a document has occurred (decision block 652) may occur any number of times.

Although FIG. 6 illustrates one implementation of a process for document management, other implementations may include fewer, additional, and/or a different arrangement of operations. For example, a process for document management may include populating the state rule base or not generating a signal including document identification data during the initialization process. As another example, a process for document management may call for receiving a request for the physical-version state. The process may respond by generating a signal containing the state data, possibly including whether an allowable state violation has occurred. As an additional example, a process for document management may not call for determining whether an allowable state has been violated. This may occur, for example, if a physical-document monitoring device will perform such an operation. As a further example, a process for document management may call for tracking a physical version of a document even if no non-physical version exists. As another example, a process for document management may allow for determining whether a physical document registration request has been received (decision block 604), whether a signal representing a state of a physical version of a document has been received (decision block 620), whether a signal regarding an allowable state of a physical version of document has been received (decision block 640), and whether a change to a non-physical version of a document has occurred (decision block 652) in any order, contemporaneously, simultaneously, or otherwise. As a further example, violations of an allowable state may be communicated to the associated document monitoring system.

A variety of implementations have been described in detail, and a number of other implementations have been mentioned or suggested. Furthermore, a variety of additions, deletions, modifications, and substitutions to these implementations may be made while still achieving document management. For these reasons, the scope of the invention is to be measured by the appended claims, which may encompass one or more of the implementations.

The invention claimed is:

1. A document management system, the system comprising:

a physical-document monitoring device comprising:

a document coupling device, a sensor coupled to the document coupling device, the sensor operable to sense a state of a document and to generate a signal representative thereof, and a computer coupled to the sensor and the document coupling device, the computer operable to determine a document state based on the signal.

2. The system of claim 1, wherein the document coupling device is adapted to bind the document.

3. The system of claim 1, wherein the document state comprises the number of document pages.

4. The system of claim 3, wherein the document coupling device is part of the sensor and facilitates sensing the document state.

5. The system of claim 4, wherein the sensor senses the number of pages based on capacitance.

6. The system of claim 1, wherein the document state comprises an environmental condition of the document.

7. The system of claim 6, wherein the environmental condition comprises illumination.

8. The system of claim 1, further comprising a wireless communication device coupled to the computer, the wireless communication device operable to send data from and receive data for the computer.

9. The system of claim 8, wherein the sent data comprises the determined document state.

10. The system of claim 8, wherein the received data comprises state data for a non-physical version of the document.

11. The system of claim 10, wherein the received data comprises document meta-data.

12. The system of claim 11, wherein the document meta-data is received in the form of a text string.

13. The system of claim 8, wherein the received data comprises a document location.

14. The system of claim 8, wherein the received data comprises an allowable document state.

15. The system of claim 14, wherein the allowable document state comprises a rule that expresses the allowable document state.

16. The system of claim 1, wherein the computer is further operable to determine whether an allowable document state has been violated.

17. The system of claim 1, wherein the monitoring device further comprises a display device operable to provide a visual indication of physical document status.

18. The system of claim 1, wherein the monitoring device further comprises a user input device coupled to the computer.

19. The system of claim 18, wherein the computer is further operable to generate a wireless message to signify that activation of the user input device has occurred.

20. The system of claim 1, wherein the physical document comprises a paper-based document.

21. The system of claim 1, wherein the document coupling device is adapted to couple the monitoring device to a physical document.

22. The system of claim 21, wherein the document coupling device is one of a staple, a paper clip, or a binder clip.

23. A method by which a physical-document monitoring device facilitates management of a physical document, the method comprising:

sensing a state of the physical document, with a sensor coupled to a document coupling device;

generating a signal representing the document state with the sensor;

determining the document state based on the signal with a computer coupled to the sensor and the document coupling device; and generating a wireless signal to send a representation of the document state to a remote device.

24. The method of claim 23, further comprising coupling the physical-document monitoring device to the document.

25. The method of claim 24, wherein coupling comprises binding the document.

26. The method of claim 23, wherein the document state comprises the number of document pages.

27. The method of claim 26, wherein sensing the state of the document comprises sensing an electrical value affected by a dielectric.

28. The method of claim 23, wherein the document state comprises the location of the document.

29. The method of claim 23, wherein the document state comprises an environmental condition of the document.

30. The method of claim 23, further comprising receiving document meta-data.

31. The method of claim 23, further comprising receiving state data for a non-physical version of the document.

32. The method of claim 23, further comprising:
receiving an allowable document state; and
storing the allowable document state.

33. The method of claim 23, further comprising determining whether an allowable document state has been violated.

34. The method of claim 23, further comprising providing a visual indication of physical document status.

35. The method of claim 23, further comprising:
detecting activation of a user input device; and
generating a wireless signal to report the activation.

36. The method of 23, wherein the physical document comprises a paper-based document.

37. An article comprising a machine-readable medium storing instructions operable to cause a physical-document monitoring device comprising one or more machines to perform operations comprising:

determining whether a state of a document has been sensed with a sensor coupled to a document coupling device;

determining the document state with a computer coupled to the sensor and the document coupling device; and generating a wireless message to send a representation of the document state to a remote device.

38. The article of claim 37, wherein the document state comprises the number of document pages.

39. The article of claim 38, wherein determining the document state comprises determining an electrical value affected by a dielectric.

40. The article of claim 37, wherein the document state comprises the location of the document.

41. The article of claim 37, wherein the document state comprises an environmental condition of the document.

42. The article of claim 37, wherein the instructions are further operable to cause one or more machines to perform operations comprising determining whether document meta-data has been received.

43. The article of claim 37, wherein the instructions are further operable to cause one or more machines to perform operations comprising determining whether state data for a non-physical version of the document has been received.

44. The article of claim 37, wherein the instructions are further operable to cause one or more machines to perform operations comprising:
determining whether an allowable document state has been received; and
storing the allowable document state.

45. The article of claim 37, wherein the instructions are further operable to cause one or more machines to perform operations comprising determining whether an allowable document state has been violated.

46. The article of claim 37, wherein the instructions are further operable to cause one or more machines to perform operations comprising determining a visual indication of physical document status.

47. The article claim 37, wherein the instructions are further operable to cause one or more machines to perform operations comprising:

determining whether activation of a user input device has occurred; and generating a wireless message to report the activation.

48. The article of claim 37, wherein the physical document comprises a paper-based document.

\* \* \* \* \*